United States Patent [19]

Ocvirk et al.

[11] Patent Number: 4,950,038
[45] Date of Patent: Aug. 21, 1990

[54] SLIP-CONTROLLED HYDRAULIC BRAKE SYSTEM

[75] Inventors: Norbert Ocvirk, Offenbach; Lutz Weise, Mainz, both of Fed. Rep. of Germany

[73] Assignee: Alfred Teves GmbH, Frankfurt am Main, Fed. Rep. of Germany

[21] Appl. No.: 337,038

[22] Filed: Apr. 12, 1989

[30] Foreign Application Priority Data

Apr. 26, 1988 [DE] Fed. Rep. of Germany ....... 3814045

[51] Int. Cl.$^5$ ............................................. B60T 8/62
[52] U.S. Cl. ..................................... 303/110; 180/197; 303/100; 303/116
[58] Field of Search ........................ 303/10, 11, 59, 92, 303/110, 113, 116, 119, DIG. 3, DIG. 4, 100; 180/197; 188/181 A, 352

[56] References Cited

U.S. PATENT DOCUMENTS

| | | | |
|---|---|---|---|
| 3,101,976 | 8/1963 | Knowles | 303/10 |
| 4,402,554 | 9/1983 | Belart | 303/10 |
| 4,416,347 | 11/1983 | Bertling et al. | 180/197 |
| 4,509,802 | 4/1985 | Solleder et al. | 303/110 |
| 4,620,750 | 11/1986 | Leiber | 303/92 |
| 4,743,075 | 5/1988 | Belart et al. | 303/119 |

FOREIGN PATENT DOCUMENTS

| | | |
|---|---|---|
| 0233499 | 8/1987 | European Pat. Off. . |
| 3439408 | 7/1986 | Fed. Rep. of Germany ...... 303/116 |
| 3534443 | 11/1986 | Fed. Rep. of Germany . |
| 3717089 | 12/1988 | Fed. Rep. of Germany . |
| 3824877 | 2/1989 | Fed. Rep. of Germany ...... 303/116 |
| 2513201 | 9/1982 | France . |
| 2078323 | 1/1982 | United Kingdom . |
| 2119883 | 11/1983 | United Kingdom . |
| 2147963 | 10/1984 | United Kingdom . |
| 2144188 | 2/1985 | United Kingdom . |

*Primary Examiner*—Duane A. Reger
*Attorney, Agent, or Firm*—Robert P. Seitter

[57] ABSTRACT

An anti-lock controlled/traction-slip controlled brake system operating according to the return delivery principle. A charging circuit is provided for charging an accumulator (20). In order to charge the accumulator, valves (21, 22 and 15) are switched over, thereby establishing a pressure fluid connection between the master brake cylinder as well as the regulating valves (11, 15) by way of the pump (14) to the accumulator (20). The pump delivers fluid out of the supply reservoir (4) connected with the master brake cylinder into the accumulator (20). Since the connection between the master brake cylinder (1) and the wheel brakes remains open when the accumulator is charged, a braking operation is immediately possible even during the charging operation.

7 Claims, 1 Drawing Sheet

U.S. Patent   Aug. 21, 1990   4,950,038
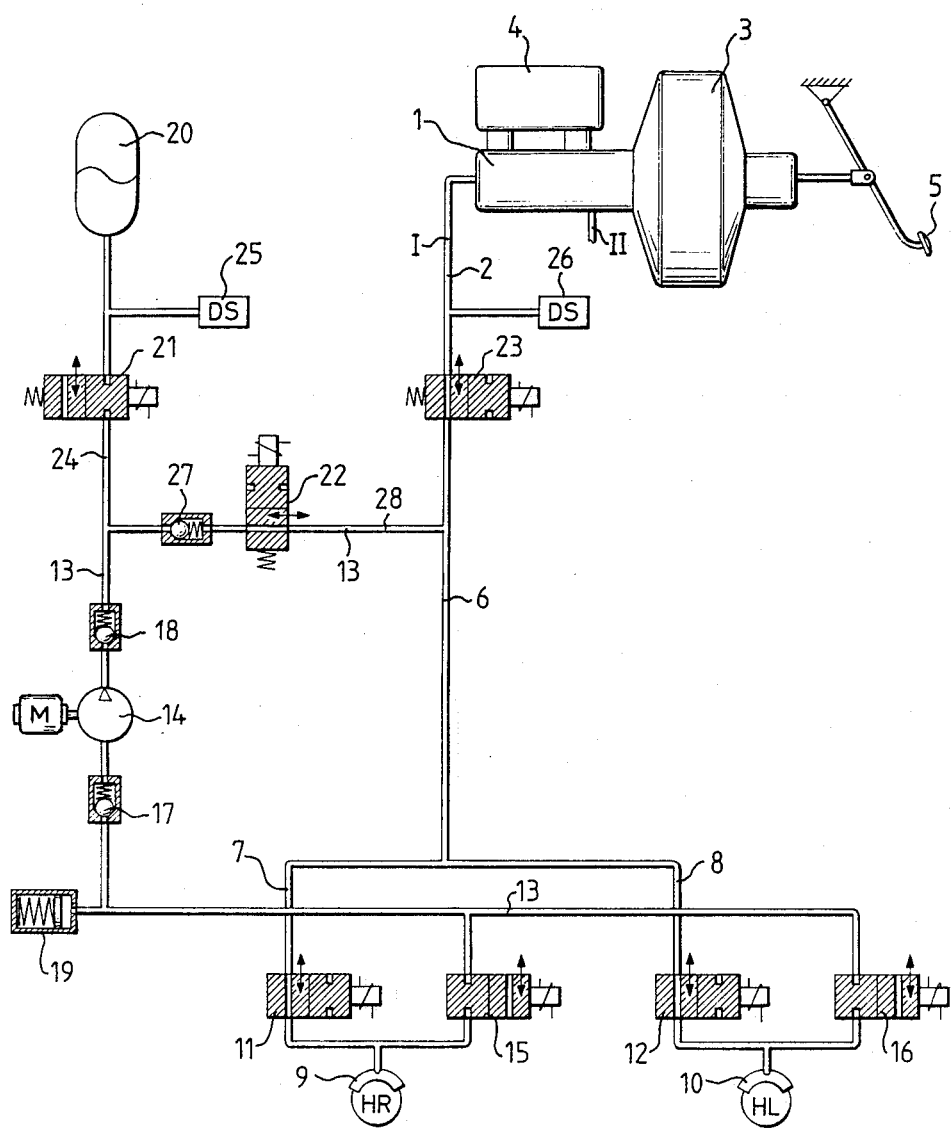

SLIP-CONTROLLED HYDRAULIC BRAKE SYSTEM

BACKGROUND OF THE INVENTION

The present invention relates to brake systems which operate according to the return delivery principle.

In order to adjust optimal slip on the wheels in these systems, pressure fluid must be supplied to the wheel brake cylinders and removed again therefrom according to a control algorithm when a brake slip control action (anti-lock controlled braking action) is performed. For pressure build-up, pressure fluid is delivered out of the master brake cylinder into the wheel brakes. For pressure decrease, this pressure fluid is supplied back into the master brake cylinder by means of a pump.

It also is known to use this hydraulic circuitry for controlling traction slip. For this purpose, a valve is switched over, and as a result the master brake cylinder is uncoupled from the brake line and a pressure accumulator is connected for traction-slip-controlled braking action. For example, in order to avoid excessive spinning of the wheels when starting to drive, pressure fluid is fed out of the accumulator to the wheel brakes, whereby the starting torque of the engine is compensated by a brake torque. For pressure decrease, the pressure fluid is returned from the wheel brakes into the accumulator by means of the pump.

Theoretically, these systems provide a closed pressure fluid system, since no new pressure fluid must be introduced. In fact, however, there is increased pressure fluid requirement due to leakage in the lines as well as due to pad wear, the result is that the accumulator must be charged in certain time intervals. To achieve this, systems have been suggested as in German patent publications DE-OS 31 37 286 and DE-OS 31 37 287. It is proposed therein that the driver is informed of the low charge condition accumulator. By this, the driver is induced to actuate a switch for issuing an activating signal to the solenoid valves, whereby a pressure fluid connection is established between master brake cylinder and accumulator in order to apply the brake. The volume which is displaced during this action out of the master brake cylinder is supplied into the accumulator by way a non-return valve. The driver can be assisted in that the master brake cylinder is connected by way of a shunt line to the inlet of the pump so that in addition to the pedal force, the suction force of the pump is available for charging the accumulator.

This method is susceptible to malfunction because the driver is called upon to interact. This is because in case the driver does not respond, the pressure in the accumulator remains on a level which does not provide a proper traction slip control action. Moreover, it may become necessary to apply the brake several times, since the fluid volume in the master brake cylinder is insufficient to charge the accumulator.

Further, German patent publication P-34 39 408 suggests supplying fluid by means of a pump by way of the shunt line, when the brake is not applied, out of the supply reservoir allocated to the master brake cylinder into the accumulator. This arrangement has the disadvantage that the valve which connects the accumulator instead of the master brake cylinder to the brake line must be actuated for charging the accumulator. An instability factor ensues therefrom, since the valve will not move into its initial position when switched back and that the connection between the master brake cylinder and the wheel brake remains interrupted. Braking therefore would not be possible.

SUMMARY OF THE INVENTION

Therefore, it is an object of the present invention to provide means for charging the accumulator which means operate independently of the driver and which means do not increase the likelihood of failure of the brake system. This object is achieved in that, even during the charging operation, there is a pressure-fluid connection between the master brake cylinder and the wheel brake cylinder so that a possible jamming of valve parts, which cannot be completely precluded, nevertheless will not lead to failure of the brake system.

Pressure switches are inserted into the brake system to monitor the charging operation and which monitor the pressure both in the master brake cylinder and in the accumulator. Furthermore, it is advantageous to arrange the valve assembly of three electromagnetically actuated two-way/two-position directional control valves, which increases the fail-safe feature, since the valve in the brake line is not actuated during the charging operation. It is also advantageous to arrange the regulating valves, that is the inlet and outlet valves, as two single valves because in doing so all switching variations can be utilized.

The brake system in accordance with the present invention is arranged and controlled such that the master brake cylinder is connected to the brake line for an anti-lock control action (control of the brake slip), whereas for a traction slip control action (traction slip control) the pressure accumulator communicates with the brake line. For charging the accumulator, opening of both the inlet valve and the outlet valve causes a pressure fluid connection to establish by way of the brake line, the inlet valve, the outlet valve and the shunt line to the pressure accumulator 20. Thus, the pump delivers fluid out of the master brake cylinder, that is out of the supply reservoir coupled to the master brake cylinder, into the accumulator. Return flow of the pressure fluid into the master brake cylinder is prevented by a charging valve in the shunt line that is, in the portion thereof in the brake line.

BRIEF DESCRIPTION OF THE DRAWING

The present invention will now be described in greater detail in the following detailed description when taken in conjunction with the accompanying drawing wherein the Figure illustrates a preferred embodiment of the present invention.

DETAILED DESCRIPTION

The brake system in accordance with the principles of the present invention comprises a master brake cylinder 1 including two brake circuits I, II. Inserted upstream of the master brake cylinder 1 is a booster which is actuated by a pedal 5. In the initial position of the master brake cylinder, when the pedal is not depressed, the working chambers of the master brake cylinder 1 are in communication with the pressure-fluid supply reservoir 4. The master brake cylinder 1 is connected to two brake circuits I, II, with the driven wheels of the rear axle being connected to one brake circuit I. Of course, different brake circuit allotments also can be utilized.

The master cylinder line 2 containing the anti-lock control valve 23 leads to the brake line 6 which branches into two branch lines 7, 8 respectively leading to wheel brake 9 and 10. Interposed in each branch line 7 and 8 is an inlet valve. The wheel brakes 9 and 10 are connected by way of a shunt line 13 and one outlet valve 15, 16 with the suction side of the pump 14. The outlet of the pump is in communication with the brake line 6 by way of another portion of the shunt line 13. The accumulator line 24 connects to the hydraulic accumulator 20 and terminates into the shunt line 13. The traction-slip control valve 21 is inserted into the accumulator line 24. Between the point where the accumulator line 24 terminates into the shunt line 13 and the point where the master cylinder line 2 terminates into the brake line 6, the connecting portion 28 of the shunt line 13 is provided and which contains the charging valve 22. A non-return valve 27 opening towards the brake line also in inserted therein. The valves 21, 22, 23 form a valve assembly and are controlled jointly for activating the different applications of the hydraulic brake. An intermediate accumulator 19 is allocated to the suction side of the pump accommodates the pressure fluid discharged from the wheel brake cylinders.

The pump 14 is driven by a motor M. This pump preferably is a piston-type pump furnished with suction and pressure valves 17 and 18. Pressure switches are utilized which monitor the pressure in the accumulator 20 (pressure switch 25) and the pressure in the master brake cylinder 1 (pressure switch 26).

The valves described herein preferably are two-way/two-position directional control valves which are activated electromagnetically. Their initial positions are represented by the symbols in the figures. The brake system can be actuated in four different ways: (1) conventional braking operation; (2) anti-lock controlled braking operation; (3) traction-slip controlled braking operation; and, (4) charging of the accumulator.

To actuate the brake, the pedal 5 is depressed and the booster 3 is activated. The pedal force as well as the booster force act upon the master brake cylinder 1, and the working chambers therein decrease as a result. The pressure fluid is directed by way of the line 2, the open anti-lock control valve 23, the brake line 6 as well as the branch lines 7 and 8 and the open inlet valves 11 and 12 to the wheel brake cylinders 9, 10. The wheel brakes are actuated in a conventional braking operation. During a conventional braking operation, the rotational behavior of the wheels is constantly monitored.

When during the monitoring it is detected that one of the wheels tends to lock, an anti-lock controlled braking operation is initiated. This anti-lock controlled braking operation consists of three phases: In the first phase in which the pressure is maintained constant, both the inlet valve 11, 12 and the outlet valve 15, 16 are closed. The pressure in the associated wheel brake cylinder remains constant. In the second phase of pressure reduction, the outlet valve 15, 16 is opened so that pressure fluid moves out of the associated wheel brake cylinders into the intermediate accumulator 19. From there, the pump 14 delivers the fluid by way of the non-return valve 27, the open charging valve 22 as well as the open anti-lock control valve 23 back into the master brake cylinder 1. In the third phase of pressure build-up, the outlet valve 15, 16 is re-closed and the inlet valve 11, 12 is re-opened so that the pressure fluid again propagates out of the master brake cylinder into the wheel brake cylinder.

The valves 11, 12, 15, 16 are actuated according to a control algorithm derived from the rotational behavior of the wheels so that an amount of slip is adjusted on the wheels which transmits both longitudinal and lateral forces on the wheels.

The wheel brakes also can be utilized in order to establish a brake torque to counteract a surplus of drive torque. Spinning of the wheels thereby is prevented. During a traction-slip controlled braking operation, the hydraulic accumulator 20 instead of the master cylinder 1 is connected to the brake line 6 caused by change-over of the anti-lock control valve 23 and the traction-slip control valve 21. The three phases as hereinabove described can be distinguished also in the event of a traction-slip controlled braking operation. For pressure build-up, pressure fluid is supplied out of the accumulator 20 to the wheel brake cylinders 9 and 10, respectively by way of the open traction-slip control valve 21, the line 24, the open charging valve 22, the brake line 6 and the inlet valves 11 and 12. For pressure reduction, the pump 14 respectively feeds by way of the outlet valves 15, 16 pressure fluid out of the wheel brake cylinders 9 and 10 back into the accumulator 20. Since the anti-lock control valve 23 is closed, no pressure fluid will reach the master brake cylinder 1.

The pressure fluid accumulator 20 is monitored constantly by a pressure switch 25. When the pressure in the accumulator drops below a predetermined value, which is registered by the pressure switch 25, a charging operation will be initiated. The precondition therefore is that no braking operation takes place, that is the pressure switch 26 does not indicate any pressure in the master brake cylinder, and that no traction-slip controlled braking operation is effected. As soon as the predetermined criteria exist, the traction-slip control valve 21 switches into its opened position, the charging valve 22 assumes its closed position and the outlet valve 15 adopts its opened position. The anti-lock control valve 23 remains in its opened position, as does the inlet valve 11. In addition, the outlet valve 16 also can be changed over. This provides the pressure fluid flow with a larger cross-section. The pump then feeds out of the master brake cylinder 1 which communicates with the supply reservoir 4 in the event of the pedal is not applied, respectively by way of the line 2, 6, 7 and 8, the open valves 11, 15 and 12, 16, and, the shunt line 13 into the accumulator line 24 and thus into the hydraulic accumulator 20. Return flow of the pressure fluid into the master cylinder 1 is prevented by the charging valve 22.

Upon depression of the pedal 5, which can be monitored by a pedal switch, the charging operation is interrupted, and pressure can be built up instantaneously in the wheel brakes, since the valves 23 and 11 and 12, respectively, are in their opened position. The charging operation will be terminated when the pressure switch 25 indicates a top limit value.

What is claimed is:

1. A slip-controlled hydraulic brake system for a vehicle comprising a master cylinder (1), a working chamber of said cylinder being connected to a supply reservoir (4) when the brake is not applied, comprising a hydraulic accumulator (20), the master brake cylinder (1) and the hydraulic accumulator (20) being in communication by a valve assembly (21, 22, 23) with a brake line (6) which leads to a wheel brake (9, 10) of a driven wheel, and further comprising an inlet valve (11, 12) contained in the brake line (6), a shunt line (13) leading to the inlet valve (11, 12) into which a pump (14) is inserted that delivers fluid by way of an outlet valve (15, 16) out of the wheel brake cylinders (9, 10), wherein the valve assembly (21, 22, 23) includes a switch position (valve 22) in which the shunt line on the pressure side of the pump is closed and the hydraulic accumulator is connected to the pump outlet for a charging operation, and wherein the inlet valve (11, 12) and the outlet valve (15, 16) are switchable simultaneously into an opened position, and wherein a connection between said master cylinder (1) and the wheel brake remains open when the hydraulic accumulator (20) is connected to the pump outlet during said charging operation so that a braking operation immediately can be performed during said charging operation.

2. A brake system as claimed in claim 1, wherein the pressure in the master brake cylinder (1) and the pressure in the hydraulic accumulator (20) are each monitored by a pressure switch (25, 26).

3. A slip-controlled hydraulic brake system for a vehicle comprising a master cylinder (1), a working chamber of said cylinder being connected to a supply reservoir (4) when the brake is not applied, comprising a hydraulic accumulator (20), the master brake cylinder (1) and the hydraulic accumulator (20) being in communication by a valve assembly (21, 22, 23) with a brake line (6) which leads to a wheel brake (9, 10) of a driven wheel, and further comprising an inlet valve (11, 12) contained in the brake line (6), a shunt line (13) leading to the inlet valve (11, 12) into which a pump (14) is inserted that delivers fluid by way of an outlet valve (15, 16) out of the wheel brake cylinders (9, 10), wherein the valve assembly (21, 22, 23) includes a switch position (valve 22) in which the shunt line on the pressure side of the pump is closed and the hydraulic accumulator is connected to the pump outlet, and wherein the inlet valve (11, 12) and the outlet valve (15, 16) are switchable simultaneously into an opened position, wherein the pressure in the master brake cylinder (1) and the pressure in the hydraulic accumulator (20) are each monitored by a pressure switch (25, 26), wherein the valve assembly (21, 22, 23) comprises three two-way/two-position directional control valves which are actuated electromagnetically, of which a first valve (anti-lock) control valve 23) being allocated to the master cylinder, a second valve (traction-slip control valve 21) being allocated to the hydraulic accumulator, and a third valve (charging valve 22) being arranged in a portion of the shunt line (13), a connecting line (28) between the brake line (6) and an accumulator line (24).

4. A brake system as claimed in claim 3, wherein a non-return valve (27) is inserted into said connecting line (28).

5. A slip-controlled hydraulic brake system for a vehicle comprising a master cylinder (1), a working chamber of said cylinder being connected to a supply reservoir (4) when the brake is not applied, comprising a hydraulic accumulator (20), the master brake cylinder (1) and the hydraulic accumulator (20) being in communication by a valve assembly (21, 22, 23) with a brake line (6) which leads to a wheel brake (9, 10) of a driven wheel, and further comprising an inlet valve (11, 12) contained in the brake line (6), a shunt line (13) leading to the inlet valve (11, 12) into which a pump (14) is inserted that delivers fluid by way of an outlet valve (15, 16) out of the wheel brake cylinders (9, 10), wherein the valve assembly (21, 22, 23) includes a switch position (valve 22) in which the shunt line on the pressure side of the pump is closed and the hydraulic accumulator is connected to the pump outlet, and wherein the inlet valve (11, 12) and the outlet valve (15, 16) are switchable simultaneously into an opened position, wherein the inlet valve (11, 12) and the outlet valve (15, 16) each comprise one electromagnetically actuated two-way/two-position directional control valve and wherein said pump draws fluid from the working chamber of the master cylinder by way of the open inlet and outlet valves when the brakes are not activated.

6. A brake system as claimed in claim 1, wherein an intermediate accumulator (19) is connected into the shunt line (13) on the suction side of the pump.

7. A brake system as claimed in claim 3, wherein the pump (14) is switched on for charging the accumulator (20), with the connection of the brake line (6) to the master brake cylinder as well as the connection of the pressure accumulator (20) to the shunt line (13) and the inlet valves and outlet valves (11, 12, 15, 16) being opened and the shunt line (13) between the pressure-accumulator line (24) and the brake line (6) being closed.

* * * * *